United States Patent [19]  [11] Patent Number: 4,887,561
Kishi  [45] Date of Patent: Dec. 19, 1989

[54] METHOD OF CONTROLLING VALVE OPERATION IN AN INTERNAL COMBUSTION ENGINE

[75] Inventor: Noriyuki Kishi, Tokyo, Japan

[73] Assignee: Honda Giken Kogyo Kabushiki Kaisha, Tokyo, Japan

[21] Appl. No.: 337,492

[22] Filed: Apr. 13, 1989

[30] Foreign Application Priority Data

Apr. 13, 1988 [JP] Japan ................................. 63-91169

[51] Int. Cl.⁴ .............................................. F01L 1/34
[52] U.S. Cl. .............................................. 123/90.16
[58] Field of Search ............... 123/90.12, 90.13, 90.15, 123/90.16, 90.4

[56] References Cited

U.S. PATENT DOCUMENTS

| | | | |
|---|---|---|---|
| 4,009,695 | 3/1977 | Ule | 123/90.13 |
| 4,534,323 | 8/1985 | Kato et al. | 123/90.16 |
| 4,535,732 | 8/1985 | Nakano et al. | 123/90.16 |
| 4,537,164 | 8/1985 | Ajiki et al. | 123/90.16 |
| 4,537,165 | 8/1985 | Honda et al. | 123/90.16 |
| 4,545,342 | 10/1985 | Nakano et al. | 123/90.16 |
| 4,576,128 | 3/1986 | Kenichi | 123/90.16 |
| 4,587,936 | 5/1986 | Matsuura et al. | 123/90.12 |
| 4,612,884 | 9/1986 | Ajiki et al. | 123/90.16 |
| 4,656,977 | 4/1987 | Nagahiro et al. | 123/90.16 |
| 4,690,110 | 9/1987 | Nishimura et al. | 123/90.4 |
| 4,726,332 | 2/1988 | Nishimura et al. | 123/90.16 |
| 4,727,830 | 3/1988 | Nagahiro et al. | 123/90.16 |
| 4,727,831 | 3/1988 | Nagahiro et al. | 123/90.16 |
| 4,741,297 | 5/1988 | Nagahiro et al. | 123/90.16 |
| 4,759,322 | 7/1988 | Konno | 123/90.16 |
| 4,765,289 | 8/1988 | Masuda et al. | 123/90.16 |

Primary Examiner—Charles J. Myhre
Assistant Examiner—Weilun Lo
Attorney, Agent, or Firm—Lyon & Lyon

[57] ABSTRACT

A method of controlling the operation of engine valves in an internal combustion engine, dependent on the rotational speed of the engine, by controlling a valve operation changing mechanism capable of opening and closing the engine valves selectively in a low-speed mode of operation corresponding to low-speed operation of the engine and a high-speed mode of operation corresponding to high-speed operation of the engine, the method includes the steps of determining the rotational speed of the engine at which the output torque produced by the engine when the valve operation changing mechanism is in the low-speed mode of operation and the output torque produced by the engine when the valve operation changing mechanism is in the high-speed mode of operation are of a certain relationship to each other and selecting a switching rotational speed for switching operation of the valve operation changing mechanism based on said determined engine rotational speed.

3 Claims, 4 Drawing Sheets

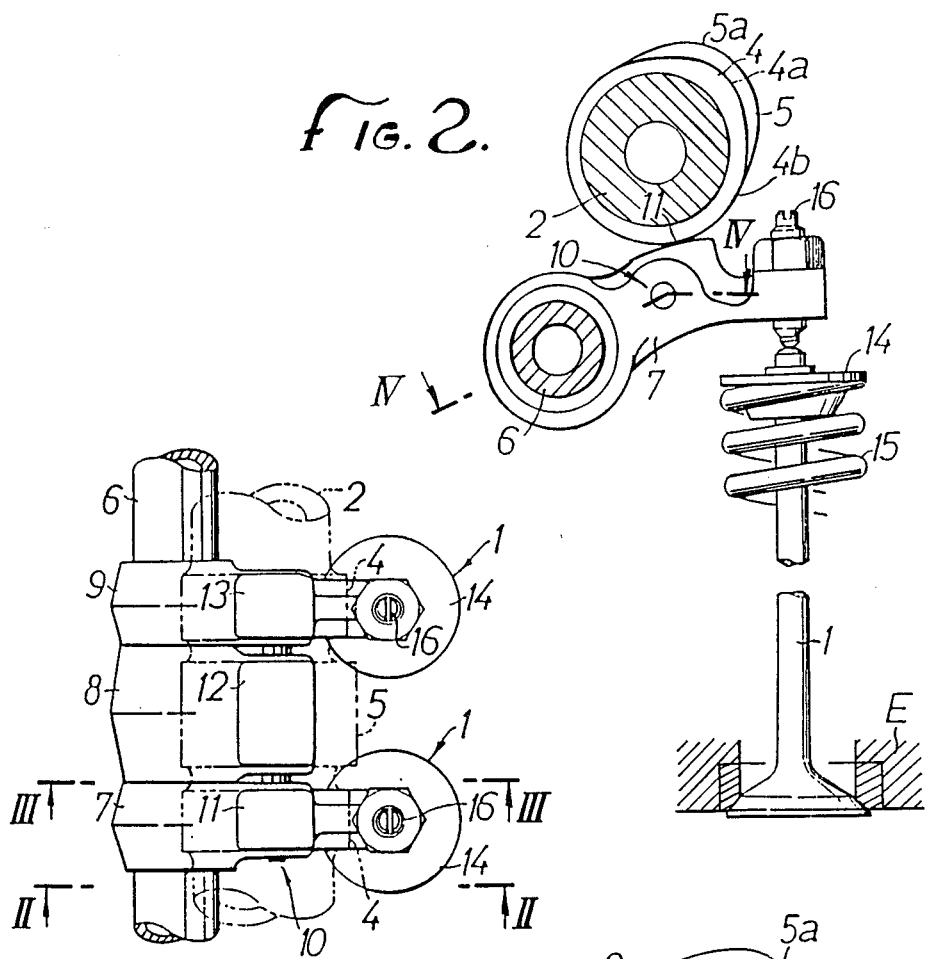
FIG. 2.
FIG. 1.
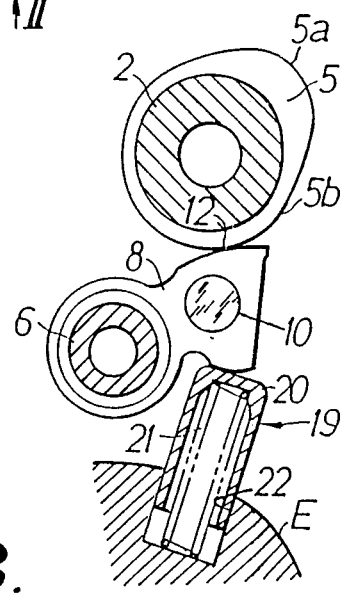
FIG. 3.

METHOD OF CONTROLLING VALVE OPERATION IN AN INTERNAL COMBUSTION ENGINE

The present invention relates to a method of controlling operation of engine valves in an internal combustion engine, dependent on the rotational speed of the engine, by controlling a valve operation changing mechanism capable of opening and closing the engine valves selectively in a low-speed mode of operation corresponding to low-speed operation of the engine and a high-speed mode of operation corresponding to high-speed operation of the engine.

There are numerous prior art patents, for example U.S. Pat. No. 4,545,342, which discloses, an arrangement for switching modes of operation of engine valves such as intake valves or exhaust valves dependent on the rotational speed of the engine.

The engine has different output torque characteristics when the engine valves operate in low- and high-speed modes, respectively. The running characteristics of the motor vehicle equipped with the engine are affected by the points on a graph of the output torque characteristics where a mechanism for changing the valve operation modes is actuated. It is customary to maintain good running characteristics by actuating the valve operation mode changing mechanism when the engine rotates at a predetermined speed at which both output torque characteristics are of a fixed relationship to each other. Output torques of the engine in the low- and high-speed operation modes are however liable to vary because of different dimensional variations of mass-produced engines, time-dependent durability degradation, and other factors. If the valve operation mode changing mechanism is actuated always at the same predetermined engine speed, therefore, the motor vehicle may fail to exhibit good running performance on certain transitions of engine operation.

It is an object of the present invention to provide a method of controlling valve operation in an internal combustion engine by actuating a valve operation mode changing mechanism when engine output torques in respective low- and high-speed modes are of a fixed relationship to each other to maintain good running performance at all times.

According to a first feature of the present invention, a rotational speed of the engine at which an output torque produced by the engine when the valve operation changing mechanism is in the low-speed mode of operation and an output torque produced by the engine when the valve operation changing mechanism is in the high-speed mode of operation are of a certain relationship to each other are determined, and a switching rotational speed for switching operation of the valve operation changing mechanism is selected based on said determined engine rotational speed.

According to a second feature of the present invention, a high-/low-speed-mode switching rotational speed for switching the valve operation changing mechanism from the high-speed mode of operation to the low-speed mode of operation is selected base on the determined engine rotational speed at which the output torque produced by the engine when the valve operation changing mechanism is in the low-speed mode of operation and the output torque produced by the engine when the valve operation changing mechanism is in the high-speed mode of operation are equal to each other, and a rotational speed which is higher than said high-/low-speed-mode switching rotational speed by a constant value is selected as a low-/high-speed-mode switching rotational speed for switching the valve operation changing mechanism from the low-speed mode of operation to the high-speed mode of operation.

According to the above first feature, as the output torques in the low- and high-speed modes vary dependent on the operating conditions of the engine, the rotational speed of the engine at which the these output torques are of a certain relationship to each other are determined, and the valve operation changing mechanism is controlled based on the determined engine rotational speed. Therefore, regardless of changes in the engine operation, the valve operation changing mechanism will always be switched when the output torques are of the certain relationship to each other to maintain good operating performance of the engine.

According to the second feature, no shock is produced when the valve operation changing mechanism is switched from the high-speed mode to the low-speed mode, and the acceleration capability of the engine is increased when the valve operation changing mechanism is switched from the low-speed mode to the high-speed mode.

A preferred embodiment to the present invention will be described in connection with the drawings, wherein:

FIG. 1 is a plan view of a valve operating mechanism capable of operating in either of two different modes;

FIG. 2 is a sectional elevation view taken on the line II—II in FIG. 1;

FIG. 3 is a sectional elevation view taken on the line III—III in FIG. 1;

Figure 4:
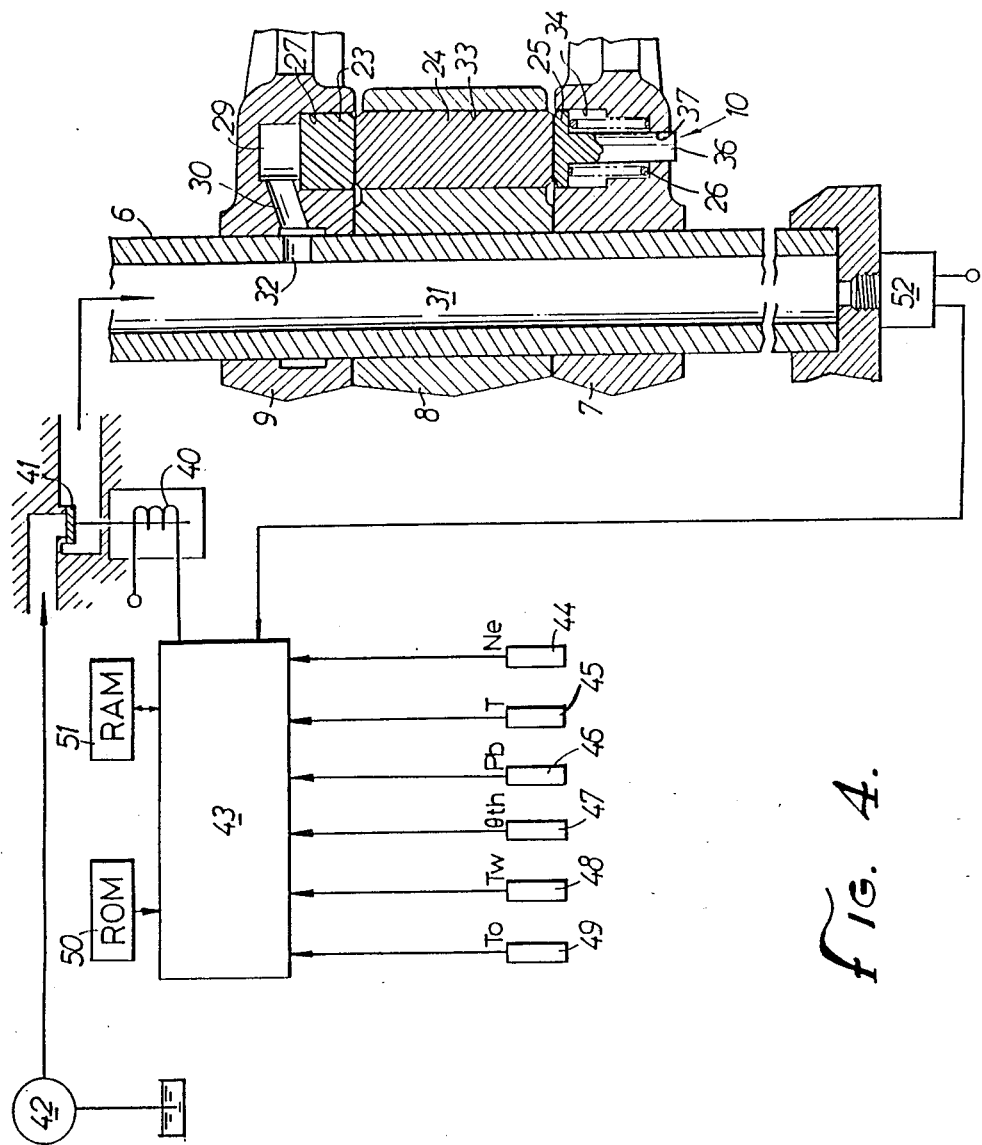
FIG. 4 is a combination of a sectional plan view taken on the line IV—IV in FIG. 2 and a block diagram of the hydraulic pressure system and controls.

As shown in FIGS. 1 and 2, a pair of intake valves 1 disposed in an engine body E are opened and closed by a low-speed cam 4, a high-speed cam 5, and another low-speed cam 4 which are integrally formed on a camshaft 2 rotatable by the crankshaft of the engine at a speed ratio of ½ with respect to the speed of rotation of the engine crankshaft, by first, second, and third rocker arms 7, 8, 9 pivotally supported on a rocker shaft 6 extending parallel to the camshaft 2, and by a valve operation mode changing mechanism 10 disposed between the rocker arms 7, 8, 9.

The camshaft 2 is rotatably disposed above the engine body E. The low-speed cams 4 are integrally formed with the camshaft 2 in alignment with the intake valves 1, respectively. The high-speed cam 5 is integrally formed with the camshaft 2 between the low-speed cams 4. Each of the low-speed cams 4 has a cam lobe 4a projecting radially outwardly to a relatively small extent and a base circle portion 4b. The high-speed cam 5 has a cam lobe 5a projecting radially outwardly to a larger extent than the cam lobe 4a with an angular extent larger than the cam lobe 4a, and a base circle portion 5b.

The rocker shaft 6 is fixed below the camshaft 2. The first rocker arm 7 which is operatively associated with one of the intake valves 1, the third rocker arm 9 which is operatively associated with the other intake valve 1, and the second rocker arm 8 disposed between the first and third rocker arms 7, 9, are pivotally supported on the rocker shaft 6 in mutually adjacent relation. The first rocker arm 7 has on its upper surface a cam slipper 11 held in slidable contact with one low-speed cam 4. The second rocker arm 8 has on its upper surface a cam slipper 12 held in slidable contact with the high-speed cam 5. The third rocker arm 9 has on its upper surface a cam slipper 13 held in slidable contact with the other low-speed cam 4.

Flanges 14 are attached to the upper ends of the intake valves 1, respectively. The intake valves 1 are normally urged in a closing direction, i.e., upwardly, by valve springs 15 disposed between the flanges 14 and the engine body E. Tappet screws 16 are adjustably threaded through the first and third rocker arms 7, 9 so as to be engageable with the upper ends of the intake valves 1.

As also shown in FIG. 3, the second rocker arm 8 extends from the rocker shaft 6 toward the intake valves 1 but does not engage a valve. The second rocker arm 8 is normally resiliently biased in a direction to be slidably held against the high-speed cam 5 by a resilient urging means 19 disposed between the second rocker arm 8 and the engine body E.

The resilient urging means 19 comprises a bottomed cylindrical lifter 20 held against the second rocker arm 8 and a lifter spring 21 interposed between the lifter 20 and the engine body E, the lifter 20 being slidably fitted in a bottomed hole 22 defined in the engine body E.

As shown in FIG. 4, the valve operation mode changing mechanism 10 is disposed between the rocker arms 7 through 9 for selectively connecting and disconnecting the rocker arms 7 through 9 to change modes of operation of the intake valves 1.

The valve operation mode changing mechanism 10 comprises a first switching pin 23 for connecting the third and second rocker arms 9, 8, a second switching pin 24 for connecting the second and first rocker arms 8, 7, a third switching pin 25 for limiting movement of the first and second switching pins 23, 24, and a return spring 26 for normally urging the switching pins 23 through 25 in a direction to disconnect the rocker arms 7 through 9.

The third rocker arm 9 has a bottomed guide hole 27 defined therein parallel to the rocker shaft 6 and opening toward the second rocker arm 8. The first switching pin 23 is slidably fitted in the guide hole 27, with a hydraulic pressure chamber 29 being defined between the first switching pin 23 and the closed end of the guide hole 27. The third rocker arm 9 also has a communication passage 30 defined therein in communication with the hydraulic pressure chamber 29. The rocker shaft 6 has a hydraulic pressure supply passage 31 defined therein. The communication passage 30 and the hydraulic pressure supply passage 31 communicate with each other at all times through a communication hole 32 defined in a side wall of the rocker shaft 6 irrespective of how the third rocker arm 9 may be angularly moved.

The second rocker arm 8 has a guide hole 33 defined therein between its opposite sides and extending parallel to the rocker shaft 6. The guide hole 33 has the same diameter as that of the guide hole 27. The second switching pin 24 is slidably fitted in the guide hole 33.

The first rocker arm 7 has a bottomed guide hole 34 defined therein parallel to the rocker shaft 6 and opening toward the second rocker arm 8, the guide hole 34 being of the same diameter as that of the guide hole 33. The third switching pin 25 is slidably fitted in the guide hole 34 with its coaxial shank 36 movably inserted in a guide hole 37 defined in the closed end of the guide hole 34. A return spring 26 is disposed around the shank 36 between the closed end of the guide hole 34 and the third switching pin 25 for normally urging the abutting switching pins 23 through 25 in the direction to disconnect the rocker arms 7 through 9, i.e., toward the hydraulic pressure chamber 29.

When no hydraulic pressure is supplied to the hydraulic pressure chamber 29, the switching pins 23 through 25 are moved in the disconnecting direction under the bias of the return spring 26. In this condition, the abutting surfaces of the first and second switching pins 23, 24 are positioned between the third and second rocker arms 9, 8, and the abutting surfaces of the second and third switching pins 24, 25 are positioned between the second and first rocker arms 8, 7. The rocker arms 7 through 9 are thus disconnected from each other and the valve operation changing mechanism 10 is in a low-speed mode of operation wherein the valves 1 are operated by cams 4 and rocker arms 7 and 9. When a high hydraulic pressure is supplied to the hydraulic pressure chamber 29, the switching pins 23 through 25 are moved in a direction away from the hydraulic pressure chamber 29 against the resiliency of the return spring 26. The first switching pin 23 is inserted into the guide hole 33, and the second switching pin 24 is inserted into the guide hole 34, thereby interconnecting the rocker arms 7 through 9. The valve operation changing mechanism 10 is in a high-speed mode of operation wherein the valves 1 are operated by the cam 5 and the interconnected rocker arms 7, 8, 9.

The hydraulic pressure supply passage 31 in the rocker shaft 6 is connected to a hydraulic pressure supply source 42 through a control valve 41 which can selectively be opened and closed by energizing and de-energizing a solenoid 40. When the control valve 41 is opened, the high hydraulic pressure is supplied to the hydraulic pressure chamber 29 of the valve operation changing mechanism 10. When the control valve 41 is closed, the hydraulic pressure is released from the hydraulic pressure chamber 29.

The solenoid 40 is energized and de-energized under the control of a control means 43 comprising a computer or the like. To the control means 43, there are connected a rotational speed detector 44 for detecting the rotational speed Ne of the engine, a torque detector 45 for detecting the output torque T of the engine, a vacuum detector 46 for detecting the intake vacuum Pb in the engine, a throttle valve opening detector 47 for detecting the throttle valve opening $\theta$th, a coolant temperature detector 48 for detecting the temperature Tw of the coolant in the engine, and an oil temperature detector 49 for detecting the temperature To of working oil in the engine. The control means 43 is responsive to input signals from these detectors 44 through 49 for controlling the energization and de-energization of the solenoid 40. A read-only memory (ROM) 50 and a random-access memory (PAM) 51 are also connected to the control means 43.

The valve operation changing mechanism 10 is associated with an operation verifying means 52 which may comprise a pressure switch, for example, attached to the rocker shaft 6 for detecting the hydraulic pressure in the hydraulic pressure supply passage 31 communicating with the hydraulic pressure chamber 29. When the hydraulic pressure in the hydraulic pressure passage 31 becomes higher than a preset level, the operation verifying means 52 determines that the hydraulic pressure chamber 31 is also supplied with the hydraulic pressure higher than the preset level, and that the valve operation changing mechanism 10 is switched from one mode to the other, and applies a high-level signal to the control means 43.

Figure 5:
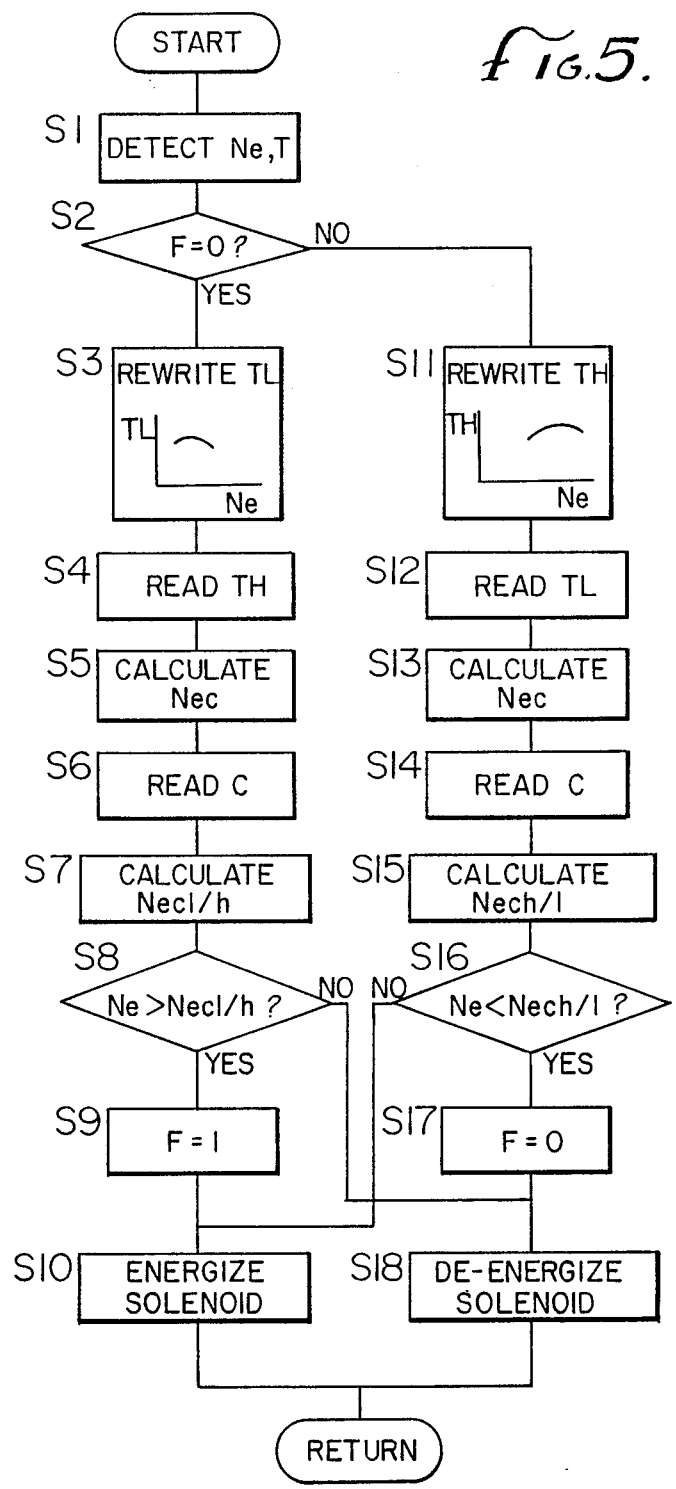
FIG. 5 is a flow chart of the control sequence.

The switching operation of the valve operation changing mechanism 10, i.e., the energization and deenergization of the solenoid 40, is controlled by the control means 43 according to a control sequence shown in FIG. 5.

In a first step S1, the rotational speed Ne and the output torque T of the engine are detected by the rotational speed detector 44 and the torque detector 45, respectively. A second step S2 then determines whether a flag F is 0 or not. The flag F is 1 when the valve operation changing mechanism 10 is in the high-speed mode of operation, and is 0 when the valve operation changing mechanism 10 is in the low-speed mode of operation. Therefore, the second step S2 determines whether the valve operation changing mechanism 10 is in the low-speed mode of operation.

If the valve operation changing mechanism 10 is in the low-speed mode of operation (F=0) in the step S2, then the characteristics of an output torque TL in the low-speed mode of operation is rewritten based on the detected torque T and rotational speed Ne. That is, the output torque characteristics in the low-speed mode of operation which are stored in the random-access memory 51 are rewritten based on the latest input data.

In a fourth step S4, an output torque TH of the engine in the high-speed mode of operation is read. A fifth step S5 then calculates an engine rotational speed Nec at which the output torque TL in the low-speed mode of operation and the output torque TH in the high-speed mode of operation are equal to each other. In a sixth step S6, the control means 43 reads in an engine load determined by the intake vacuum Pb and the throttle valve opening θth, and a preset constant C determined by the coolant temperature Tw and the oil temperature To. The constant C will be used in an equation described below and serves to vary the weighting of the degree of influence in the past.

A seventh step S7 calculates, according to the following equation, a high-/low-speed-mode switching rotational speed Nech/1 for switching the valve operation changing mechanism 10 from the high-speed mode to the low-speed mode, based on the engine rotational speed Nec at which the output torques TL, TH are the same:

$$Nech/1 = \frac{C}{A} \cdot Nec + \frac{(A - C)}{A} \cdot Nech/1$$

where A represents a constant determined by the characteristics of the control means 43 which is a computer. The constant may be 65536, ; for example, but may be of a different value if the control means 43 is changed.

Figure 6:
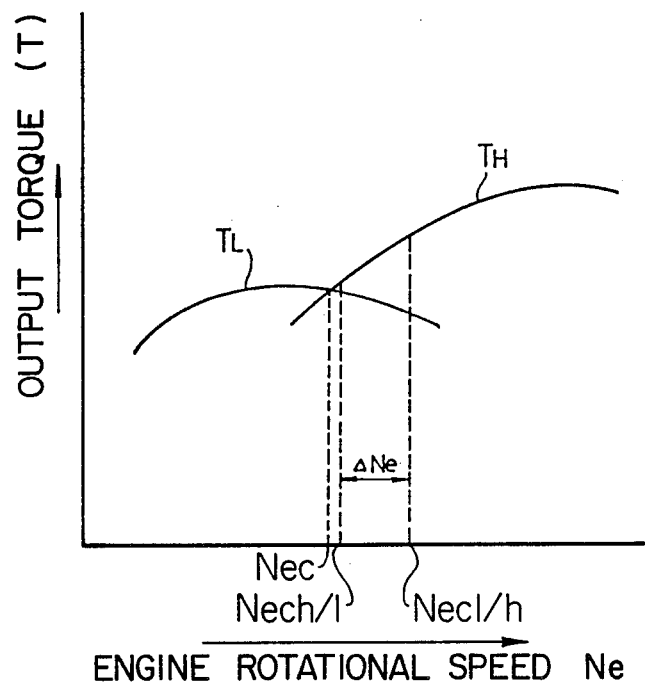
FIG. 6 is a graph showing the relationship between engine rotational speeds and output torques.

An eighth step S8 determines whether the engine rotational speed N3 exceeds a low-/high-speed mode switching rotational speed Necl/h for switching the valve operation changing mechanism 10 from the low-speed mode to the high-speed mode. As shown in FIG. 6, the low-/high-speed-mode switching rotational speed Necl/h is equal to the sum of the high-/low-speed-mode switching rotational speed Nech/1 and a constant valve ΔNe (Necl/h=Nech/1+ΔNe). If the engine rotational speed Ne exceeds Necl/h (Ne Necl/h), then control goes to a ninth step S9. If the engine rotational speed Ne is equal to or smaller than Necl/h (Ne 5 Necl/h), then control goes to an eighteenth step S18.

In the ninth step S9, the flag F is set to 1, and in a tenth step S10, the solenoid 40 is energized to put the valve operation changing mechanism 10 in the high-speed mode of operation.

If the valve operation changing mechanism 10 is in the high-speed mode of operation in the second step S2, control goes from the second step S2 to an eleventh step S11. In the eleventh step S11, the characteristics of the output torque TH in the high-speed mode of operation is rewritten based on the torque T and the rotational speed Ne which are detected in the first step S1.

In a twelfth step S12, the output torque TL of the engine in the low-speed mode of operation is read. A thirteenth step S3 then calculates an engine rotational speed Nec at which the output torque TL in the low-speed mode of operation and the output torque TH in the high-speed mode of operation are equal to each other. In a fourteenth step S14, the control means 43 reads in the preset constant 0, as with the sixth step S6. A fifteenth step S15 calculates the high-/low-speed-mode switching rotational speed Nech/1, as with the seventh step S7.

A sixteenth step S16 determines whether the engine rotational speed N3 is lower than the high-/low-speed-mode switching rotational speed Nech/1, i.e., if Ne<-Nech/1. If Ne< Nech/1, then the flag F is set to 0 in a seventeenth step S17, after which the solenoid 40 is de-energized in the eighteenth step S18 to put the valve operation changing mechanism 10 in the low-speed mode of operation.

If Ne ≧Nech/1 in the sixteenth step S16, then control proceeds to the tenth step S10.

Operation of the embodiment of the present invention will be described below. When the solenoid 40 is deenergized by the control means 43, no hydraulic pressure is supplied to the hydraulic pressure supply passage 31 and the hydraulic pressure chamber 29, and hence the rocker arms 7 through 9 are disconnected from each other. Therefore, the intake valves 1 are opened and closed by the first and third rocker arms 7, 9 which are angularly moved by the low-speed cams 4, respectively, at the timing and lift dependent on the cam profile of the low-speed cams 4.

When the solenoid 40 is energized by the control means 43, the hydraulic pressure is supplied to the hydraulic pressure supply passage 31 and the hydraulic pressure chamber 29. The rocker arms 7 through 9 are now interconnected. Since the first and third rocker arms 7, 9 are now operated in unison with the second rocker arm 8 which is angularly moved by the high-speed cam 5, the intake valves 1 are opened and closed at the timing and lift dependent on the cam profile of the high-speed cam 5.

The switching operation of the valve operation changing mechanism 10 is effected by determining the engine rotational speed Ne at which the output torques in the low-speed mode and the high-speed mode are of a certain relationship to each other, i.e., the engine rotational speed Nec at which these output torques are equal to each other, at all times as the engine operates, and comparing the detected engine rotational speed Ne with the mode switching rotational speed based on the determined engine rotational speed. Therefore, even if the operating conditions of the engine vary dependent on transitions of the engine operation, the valve operation changing mechanism 10 can be switched at all times when the output torques in the low- and high-speed modes are of a certain relationship to each other, so that the operating performance of the engine can be maintained at a high level.

Since the high-/low-speed-mode switching rotational speed Nech/1 for switching the valve operation changing mechanism 10 from the high-speed mode to the low-speed mode is determined on the basis of the engine rotational speed Nec at which the output torques in the low- and high-speed modes are the same as each other, no shock is produced when the valve operation changing mechanism 10 is switched.

Inasmuch as the low-/high-speed-mode switching rotational speed Necl/h for switching the valve operation changing mechanism 10 from the low-speed mode to the high-speed mode is determined on the basis of the sum of the constant value ΔNe and the high-/low-speed-mode switching rotational speed Nech/1 which is determined based on the engine rotational speed Nec at which the output torques in the low- and high-speed modes are the same as each other, the acceleration capability of the engine is increased.

While the present invention has been described as being applied to the control of operation of the intake valves, the invention is also applicable to the control of operation of exhaust valves.

The torque detector 45 may be dispensed with, and the torque may be detected based on the throttle valve opening θth detected by the throttle valve opening detector 47 and the intake vacuum Pb detected by the vacuum detector 46.

According to the first feature of the present invention, as described above, a rotational speed of the engine at which an output torque produced by the engine when the valve operation changing mechanism is in the low-speed mode of operation and an output torque produced by the engine when the valve operation changing mechanism is in the high-speed mode of operation are of a certain relationship to each other are determined, and a switching rotational speed for switching operation of the valve operation changing mechanism is selected based on said determined engine rotational speed. Therefore, irrespective of changes of the engine operation and dimensional irregularities among the engines produced when the engine is manufactured, the valve operation changing mechanism is always switched when the output torques are of the certain relationship to each other to maintain good operating performance of the engine.

According to the second feature of the invention, a high-/low-speed-mode switching rotational speed for switching the valve operation changing mechanism from the high-speed mode of operation to the low-speed mode of operation is selected based on the determined engine rotational speed at which the output torque produced by the engine when the valve operation changing mechanism is in the low-speed mode of operation and the output torque produced by the engine when the valve operation changing mechanism is in the high-speed mode of operation are equal to each other, and a value which is higher than said high-/low-speed-mode switching rotational speed by a constant value is selected as a low-/high-speed-mode switching rotational speed for switching the valve operation changing mechanism from the low-speed mode of operation to the high-speed mode of operation. Therefore, the acceleration capability of the engine is increased when the valve operation changing mechanism is switched from the low-speed mode to the high-speed mode, and no shock is produced when the valve operation changing mechanism is switched from the high-speed mode to the low-speed mode.

We claim:

1. A method of controlling operation of engine valves in an internal combustion engine, dependent on the rotational speed of the engine, by controlling a valve operation changing mechanism capable of opening and closing the engine valves selectively in a low-speed mode of operation corresponding to low-speed operation of the engine and a high-speed mode of operation corresponding to high-speed operation of the engine, said method comprising the steps of: determining a rotational speed of the engine at which an output torque produced by the engine when the valve operation changing mechanism is in the low-speed mode of operation and an output torque produced by the engine when the valve operation changing mechanism is in the high-speed mode of operation are of a certain relationship to each other; and selecting a switching rotational speed for switching operation of the valve operation changing mechanism based on said determined engine rotational speed.

2. A method according to claim 1, further including the steps of: selecting a high-/low-speed-mode switching rotational speed for switching the valve operation changing mechanism from the high-speed mode of operation to the low-speed mode of operation based on the determined engine rotational speed at which the output torque produced by the engine when the valve operation changing mechanism is in the low-speed mode of operation and the output torque produced by the engine when the valve operation changing mechanism is in the high-speed mode of operation are equal to each other; and selecting a rotational speed which is higher than said high-/low-speed-mode switching rotational speed by a constant value, as a low-/high-speed-mode switching rotational speed for switching the valve operation changing mechanism from the low-speed mode of operation to the high-speed mode of operation.

3. A method according to claim 1, further including the steps of: detecting operating conditions of the engine and using said detected operating conditions for modifying said determined engine rotational speed.

* * * * *